United States Patent [19]

Hehl

[11] Patent Number: 4,889,479
[45] Date of Patent: Dec. 26, 1989

[54] CHANGING DEVICE FOR CHANGING THE PLASTIC MATERIAL TO BE SUPPLIED TO A HORIZONTAL INJECTING UNIT OF AN INJECTION MOLDING MACHINE

[76] Inventor: Karl Hehl, Arthur-Hehl-Str. 32, D-7298 Loßburg 1, Fed. Rep. of Germany

[21] Appl. No.: 330,491

[22] Filed: Mar. 30, 1989

[30] Foreign Application Priority Data

Mar. 30, 1988 [DE] Fed. Rep. of Germany ....... 3810732

[51] Int. Cl.$^4$ ............................................. B29C 45/07
[52] U.S. Cl. ..................................... 425/185; 425/190; 425/192 R; 425/542
[58] Field of Search ................... 425/185, 190, 192 R, 425/542, 567, 569, 573, 574; 182, 186

[56] References Cited

U.S. PATENT DOCUMENTS 3,981,655 9/1976 Horbach ...................... 425/192 R X
4,731,005 3/1988 Hehl .................................... 425/185
4,778,370 10/1988 Heindl et al. ........................ 425/190

FOREIGN PATENT DOCUMENTS 2040212 8/1980 United Kingdom ................ 425/542
3447597 8/1986 United Kingdom ................ 425/542

Primary Examiner—Richard L. Chiesa
Attorney, Agent, or Firm—Spencer & Frank

[57] ABSTRACT

A changing device for changing the plastic material to be supplied to a horizontal injecting unit of an injection molding machine comprises a traversing plate, which is movable by a strictly hydraulic traversing drive to a plurality of feed positions, in which respective port bores formed in the traversing plate register with a through bore that is formed in a guide bar on which the traversing plate is guided. As a result, the traversing plate can be moved with simple means by a strictly hydraulic drive to the desired positions without a need for additional controls.

9 Claims, 5 Drawing Sheets

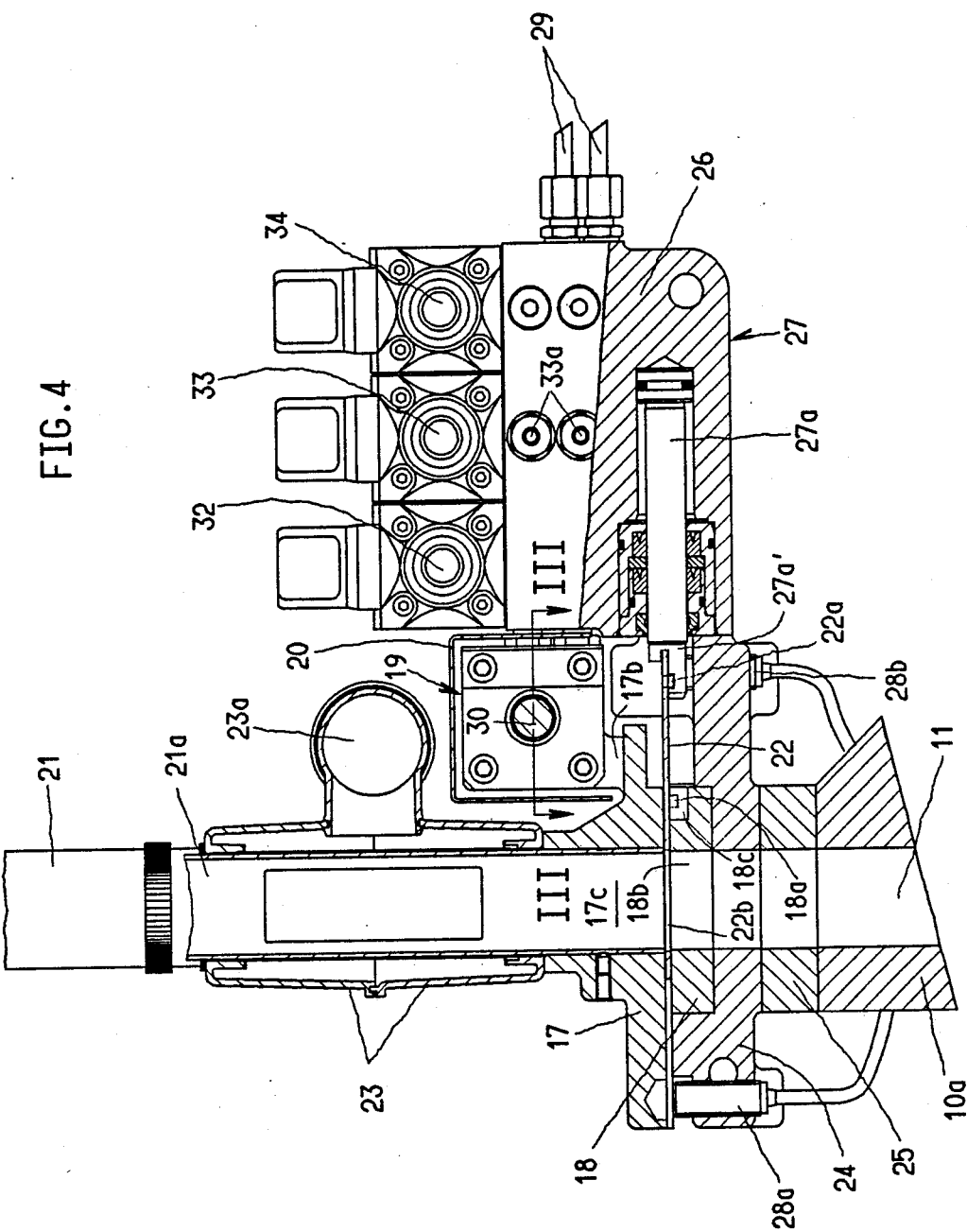

CHANGING DEVICE FOR CHANGING THE PLASTIC MATERIAL TO BE SUPPLIED TO A HORIZONTAL INJECTING UNIT OF AN INJECTION MOLDING MACHINE

BACKGROUND OF THE INVENTION

1. Field of the Invention

This invention relates to a changing device for changing the plastic material to be supplied to a horizontal injecting unit comprising a plasticizing cylinder which is mounted at its rear end in a carrier block, which changing device comprises a guide bar, which extends transversely to the injection axis of the injecting unit and has a through bore, which together with a supply passage of said carrier block constitutes a passage leading into the plasticizing cylinder, said changing device also comprises a traversing plate, which is movable along the guide bar and is formed with port bores, which are adapted to be closed by respective gates and to which respective feed hoses are adapted to be connected, which are adapted to supply the plasticizing cylinder with different plastic materials from respective supply bins, also comprises a traversing drive for moving the traversing plate in steps to any of a plurality of feed positions, in which respective port bores of the traversing plate register with the through bore of the guide bar.

2. Description of the Prior Art

A known changing device of that kind is disclosed in U.S. Pat. No. 4,731,005 and comprises an axially fixed ball screw, which is motor-driven and drives the traversing plate. Because the traversing plate which is operated by said ball screw can be continuously displaced, expensive electronic means (displacement measuring devices, limit switches) are required to ensure that the selected port bore of the traversing plate will be properly in register with the through bore in the carrier block when the associated gate is opened.

SUMMARY OF THE INVENTION

It is an object of the invention so to improve a changing device which is of the kind described first hereinbefore that the traversing plate can be positioned with much simpler means.

That object is accomplished in that the traversing drive comprises at least two piston-cylinder units, which extend in the direction in which the traversing plate is movable and have the same stroke length, one of said units comprises a stationary cylinder, which is adapted to be axially supported on said injecting unit, and a movable member, the other of said units has a member which is connected to said movable member of said one unit and a second member, which is secured to said traversing plate, and the arrangement is such that said first will be extended and said second cylinder will be retracted when an intermediate one of said port bores of said traversing plate registers with said through bore in said guide bar.

With that design the traversing drive is operated strictly hydraulically to a changing combination of the two end positions of each piston-cylinder unit (extended, retracted) of n piston-cylinder units so that the through bore can be moved into register with each of all n+1 port bores without a need for additional control means. When only two piston-cylinder units are provided, the traversing plate will be in its one end position when both piston-cylinder units are extended and in its other end position when both piston-cylinder units are retracted. If more than two piston-cylinder units are provided, the primary unit at one end of the series will be axially supported at its outer end of the injecting unit and the final unit at the other end of the series will be secured at its outer end to the traversing plate. The piston-cylinder units may be connected in series or in series opposition or in part in series and in part in series opposition.

In accordance with a preferred feature a single gate-controlling piston-cylinder unit is provided for controlling all gates and is approximately bisected by a vertical plane which contains the injection axis and said gate-controlling piston-cylinder unit is operable to move only that (selected) gate out of its closed position which is associated with a port bore with which the through bore is in register at a time.

In accordance with a further preferred feature of that selected gate is adapted to be detected by means of stationary inductive limit switches, which are arranged to disable the traversing drive unless the selected gate is in an entirely closed position.

In accordance with a preferred feature, the selected gate is coupled to the piston rod of the gate-controlling piston cylinder unit by a coupling nose, which interlocks with said piston rod, and said coupling nose extends into a retaining groove when during the traversing of the traversing plate the coupling nose has moved out of recess which is formed in the guide bar adjacent to the axis of the gatecontrolling piston-cylinder unit.

In a changing device which embodies the three features mentioned last, the traversing plate can be displaced from one extreme position to the other without a risk of a mixing of the different plastic materials contained in the supply bins.

BRIEF DESCRIPTION OF THE DRAWING

FIG. 4 is a sectional view taken on line IV—IV in FIG. 3 and showing the changing device.

DETAILED DESCRIPTION OF THE PREFERRED EMBODIMENT

Figure 1:
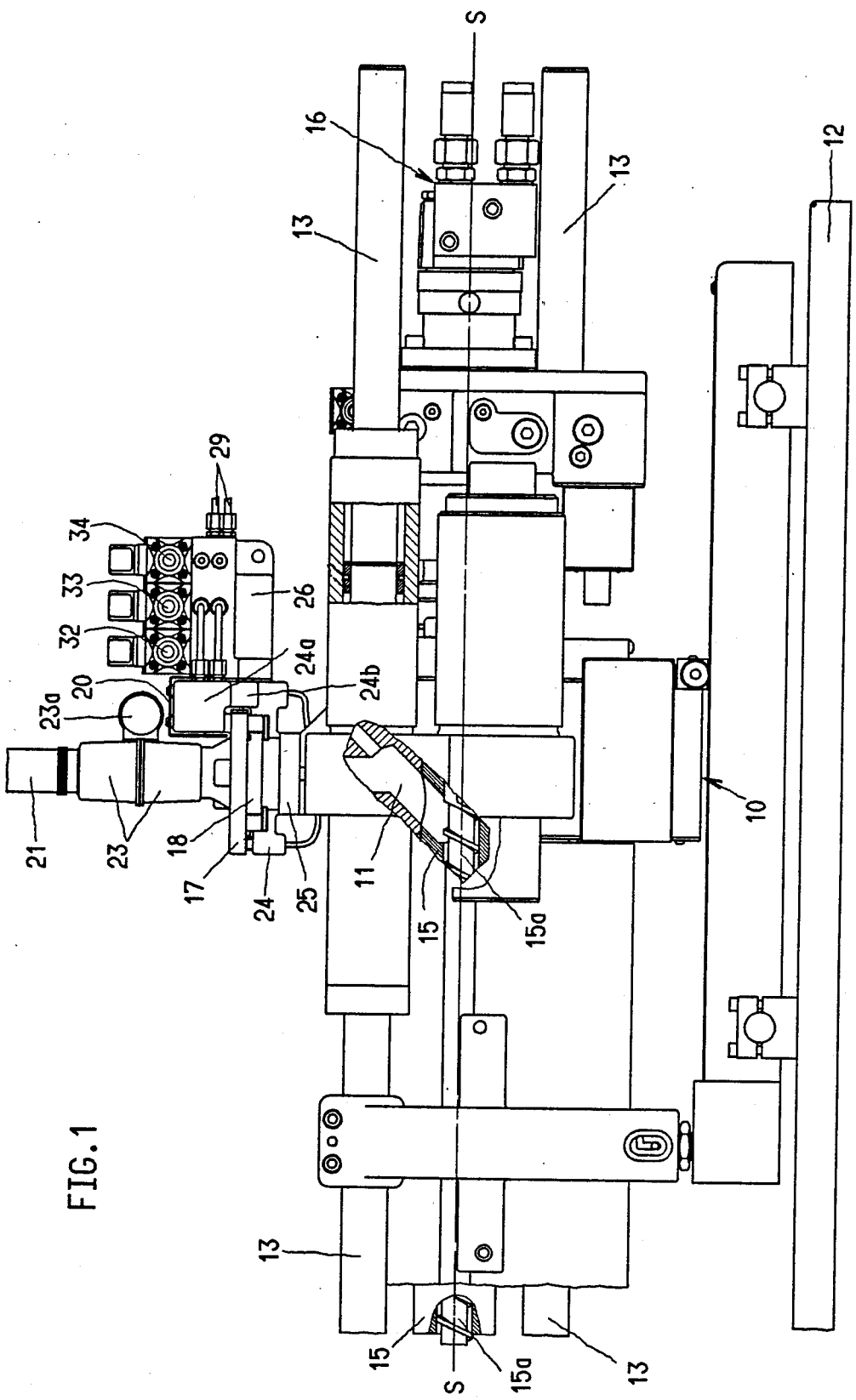
FIG. 1 is a side elevation showing the injecting unit of an injection molding machine, which injecting unit is provided with a changing device in accordance with the invention.

An illustrative embodiment of the invention will now be described more in detail with reference to the drawing.

As in particularly apparent from FIG. 1 the changing device is mounted on a horizontal injecting unit of an injection molding machine. That injecting unit comprises a plasticizing cylinder 15, which is mounted at its rear end in a carrier block 10, which is mounted on a pedestal 12 of the machine. The injecting unit is axially slidably mounted on guide rods 13. A rotary motor 16 is operable to drive the plasticizing screw 15a, which is contained in the plasticizing cylinder 15. The carrier block is integrally formed with an upright extension 10a. The changing device comprises a guide bar 18, which is attached to that projection 10a over the injecting unit and extends at right angles to the injection axis S—S that is defined by the plasticizing cylinder 15 of the injecting unit. The guide bar 18 is formed with a vertical through bore 18b, which registers with a supply passage 11 that is formed in the extension 10a and leads into the plasticizing cylinder 15. The guide bar 18 is provided with tracks 35, which serve to guide a traversing plate 17, which is displaceable by a traversing drive 19, which will be described hereinafter. The traversing plate 17 is formed with a series of equally spaced apart port bores 17c, 17c', 17", each of which is adapted to be closed by an associated gate 22, and each of which is detachably connected by means of a tubular connector 21a to a feed hose 21 so that the plasticizing cylinder 15 can selectively be supplied with different plastic materials. The feed hoses 21 are connected to respective supply bins, which contain said different plastic materials. By means of a traversing drive 19 the traversing plate 17 can be moved in steps to such positions that the through bore 18b registers with that of the port bores, 17c, 17c' and 17c" which is connected to the feed hose 21 for supplying the plastic material which is to be processed at a given time.

The traversing drive 19 consists of two pistoncylinder units H, H', which extend in the direction in which the traversing plate 17 is movable along the guide bar 18. The primary piston-cylinder unit H' comprises a stationary cylinder 24a, which is axially fixed by a connecting member 24b to a base member 24. The final piston-cylinder unit H at the other end of the traversing drive 19 comprises a cylinder 17a, which is secured to a connecting portion 17b of the traversing plate 17 and has a piston rod 30, which is connected by a connector 31 to the piston rod 30' of the primary piston-cylinder unit H'. The cylinder 24a of the primary piston-cylinder unit H' is integrally formed with the base member 24, which consists of a casting. The cylinder 17a of the final piston-cylinder unit H is integrally formed with the traversing plate 17, which also consists of a casting. This is apparent form FIGS. 3 and 3a. As each of the piston-cylinder units H, H' can be actuated to assume two end positions, namely, a fully extended and a fully retracted position, said end positions of said two piston-cylinder units H, H' can be combined to move the traversing plate 17 to various positions in which any desired one of the port bores 17c, 17c' and 17c" registers with the through bore 18b. For reasons of safety the intermediate portion of the traversing drive 19 is covered by a guard 20. The traversing drive 19 is strictly hydraulically operable. For that purpose the changing device comprises a hydraulic unit 26, which contains three control valves 32, 33, 34, which are supplied with hydraulic oil via the oil ports 29. The control valves 33, 34 control via the hydraulic lines 33a, 34a the actuation of the two piston-cylinder units H', H (see FIGS. 3 and 3a). The control valve 32 controls a gate-controlling piston cylinder unit 27, which will be described hereinafter.

Figure 3:
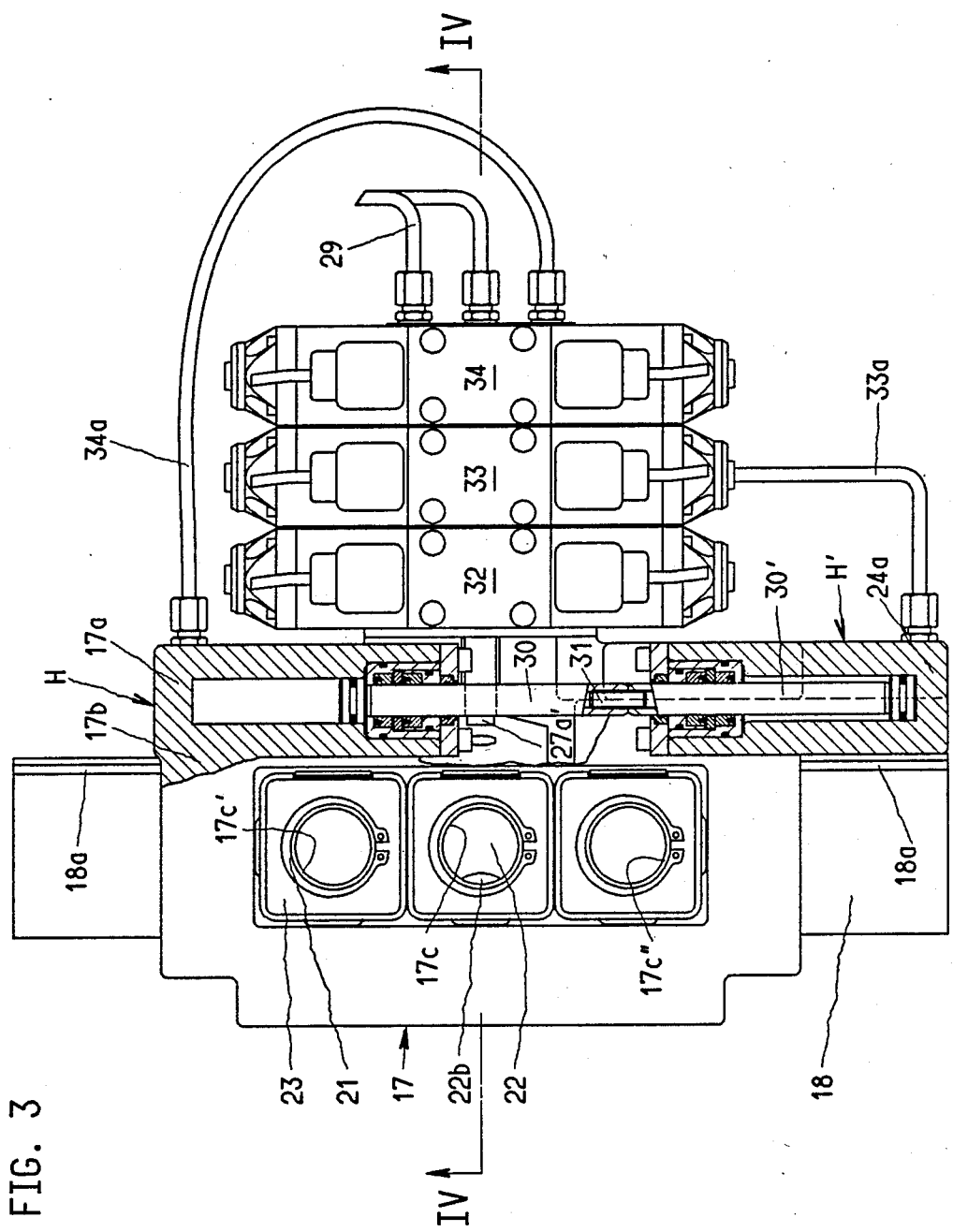
FIGS. 3 and 3a are sectional views taken on line III—III in FIG. 4 and showing the changing device in an intermediate position and in one extreme position, respectively.
Figure 3A:
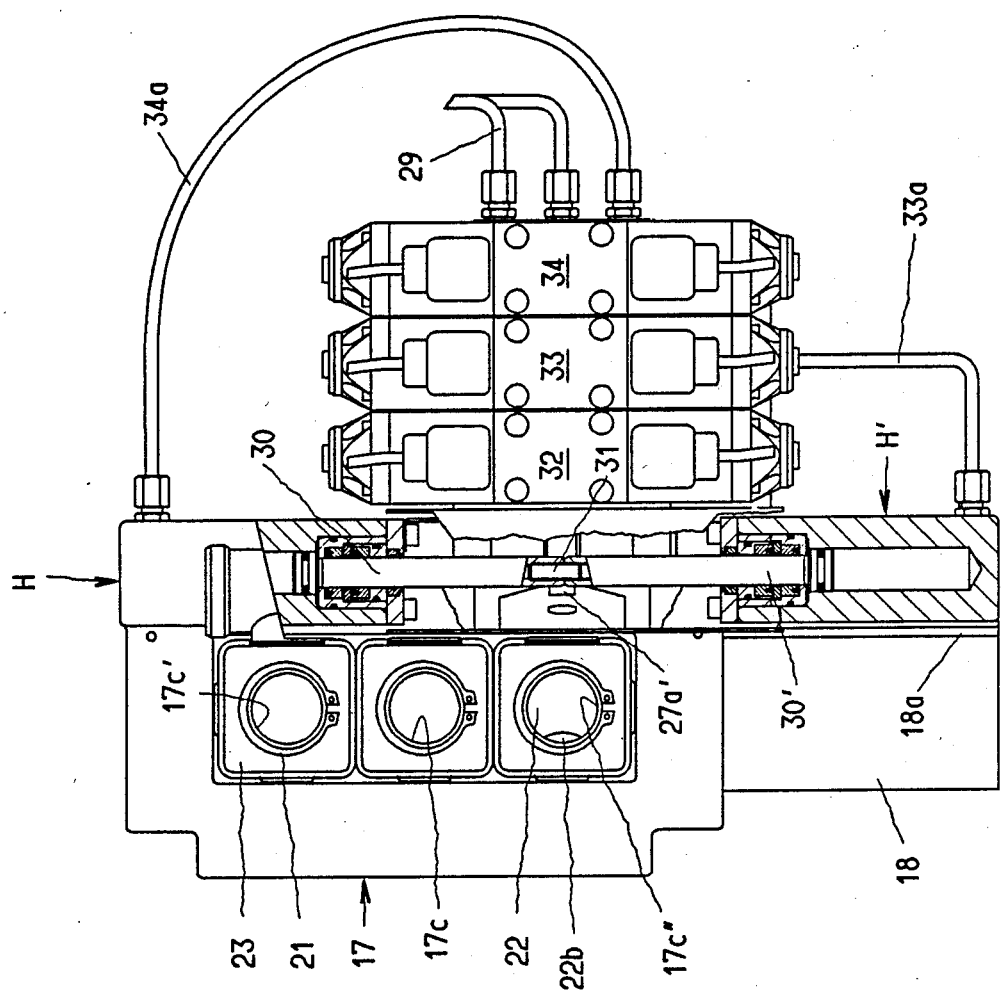

The actuation of each of the gates 22 is apparent from FIG. 4 in conjunction with FIG. 3. The gate-controlling piston-cylinder unit 27 approximately bisects the vertical plane that contains the injection axis S—S of the injecting unit and has a piston rod 27a, which has locking means 27a' for interlocking with a coupling nose 22a of each gate 22 in such a manner that a retraction of the piston rod 27a will pull the gate 22 out of its closing position so that an opening 22b of the gate 22 will be in register with the associated port bore 17c, 17c' or 17c" when the latter is in register with the through bore 18b. The traversing drive 19 cannot be operated to move the traversing plate 17 unless all gates 22 are closed and uncoupled from the piston rod 27a. Stationary inductive limit switches 28a, 28b are provided and ensure that the traversing drive 19 will be disabled unless the selected gate 22 is fully closed. During a traversing movement of the traversing plate 17 a movement of the gates 22 to or from their closed position will inherently be prevented.

The guide bar 18 is formed with a recess 18c, which is axially aligned with and open toward the gate-controlling piston-cylinder unit 27, and with a retaining groove 18a, which is open to and extends from said recess 18c on opposite sides thereof along the guide bar 18. The retaining groove 18a is arranged to receive each of said coupling noses 22a when it is outside the recess 18c. The piston rod 27a is extensible into and retractable from the recess 18c. The coupling nose 22a which protrudes from each of the gates 22 is adapted to interlock with the locking means 27a' provided on the piston rod 27a so as to couple said piston rod to said nose 22a when the piston rod 27a has been extended and the nose 22a moves into the recess 18c.

Figure 2:
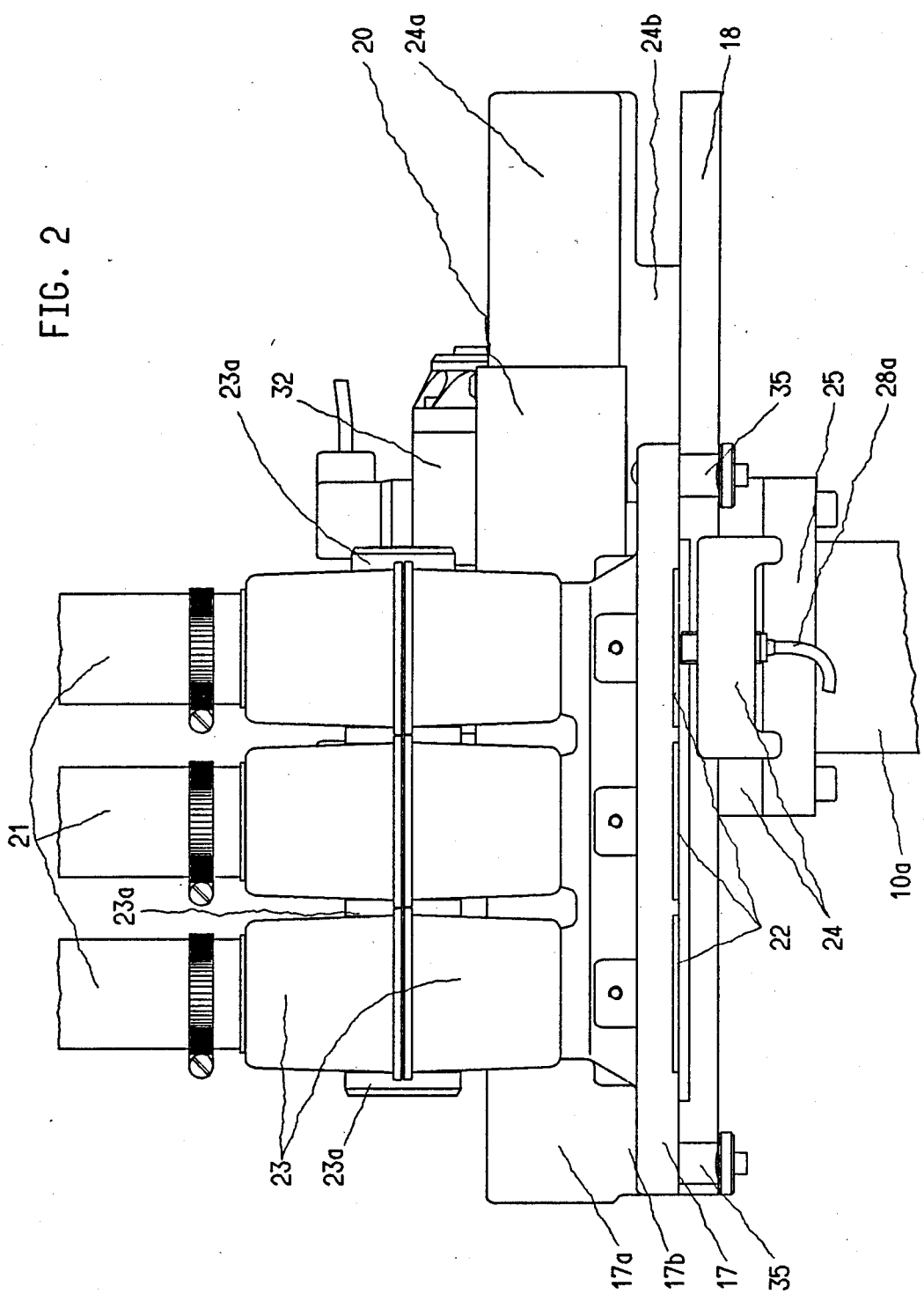
FIG. 2 is an end elevation showing the changing device in accordance with the invention.

As is apparent from FIG. 4 in conjunction with FIG. 2 each feed hose 21 communicates with a port tube 21a, which is provided with a guard 23. An air duct 23a is provided on one side of that guard and is provided with tubular ports, which are connected to respective ones of said guards 23. That air duct 23a is operable to suck off any dust which has been deposited so that an excessive concentration of dust at the working place will be avoided. The base member 24 of the changing device is detachably connected by a connecting flange 25 to the projection 10a, which is integrally formed with the carrier block 10 (see FIG. 2).

I claim:

1. In a changing device for supplying an injecting unit of an injection molding machine with a plastic material selected from a plurality of such plastic materials, such injecting unit comprises a plasticizing cylinder defining a horizontal injection axis and having a rear end and a carrier block in which said rear end of said plasticizing cylinder is mounted and which has a supply passage which communicates with the interior of said plasticizing cylinder, said changing device comprising a guide bar having a through bore and adapted to be mounted on said carrier block so that said guide bar is at right angles to said injection axis and said through bore registers with said supply passage, a traversing plate, which is movably mounted on and parallel to said guide bar and has a plurality of port bores, which are aligned along said guide bar and spaced equal distances apart along said guide bar and include two end bores and at least one intermediate bore, wherein said traversing plate is movable along said guide bar to a plurality of feed positions, in which respective ones of said port bores register with said through bore, a traversing drive for moving said traversing plate to each of said feed positions, a plurality of gates, which extend between said traversing plate and said guide bar and each of which is associated with and individually operable to open and close one of said port bores, and means for connecting a feed hose to each of said port bores for a supply of one of said plastic materials to said port bore, the improvement residing in that said traversing drive comprises a plurality of piston-cylinder units, which extend along said guide bar and are mechanically connected in series and comprise each two relatively extensible and retractable members, said piston-cylinder units comprising primary and final units at opposite ends of said plurality of units, one of said two members of said primary unit is adapted to be axially held in position, the other of said two members of said primary unit is connected to another of said piston-cylinder units, one of said two members of said final unit is secured to said traversing plate, the other of said two members of said final unit is connected to another of said piston-cylinder units, and said piston-cylinder units have equal stroke lengths, which are so related to the spacing of said port bores that said through bore will register with one of said end bores when all said piston-cylinder units are extended, said through bore will register with the other of said end bores when all said piston-cylinder units are retracted, and said through bore will register with an intermediate one of said port bores when at least one of said piston-cylinder units is extended and at least one of said piston-cylinder units is retracted.

2. The improvement set forth in claim 1, wherein said traversing plate is formed with three of said port bores and said plurality of piston-cylinder units consist of first and second end units.

3. The improvement set forth in claim 1, wherein said one member of said primary unit consists of a cylinder, said one member of said final unit consists of a cylinder, and said other members of said primary and final units consist of respective piston rods, which are connected to each other.

4. The improvement set forth in claim 3, wherein said two primary and final units are identical and said piston rods are coaxial.

5. The improvement set forth in claim 1, wherein a gate-controlling piston-cylinder unit is provided, which is substantially bisected by a vertical plane that includes said injection axis, coupling means are provided for coupling said gate-controlling piston-cylinder unit to each of said gates when that of said port bores which is associated with said gate is in register with said through bore and said gate-controlling piston-cylinder unit is operable to open and close each of said gates when it is coupled to said gate-controlling piston-cylinder unit by said coupling means.

6. The improvement set forth in claim 5, wherein stationary inductive limit switch means are provided for detecting whether said gate that is associated with that of said port bores which is in register with said through bore is in a position to close the associated port bore, and means are provided for inhibiting the operation of said traversing drive unless said limit switch means indicate that said gate is in a position to close said port bore.

7. The improvement set forth in claim 5, wherein said guide bar is formed with a recess, which is axially aligned with and open toward said gate-controlling piston-cylinder unit, and with a retaining groove which is open to and extends from said recess on opposite sides thereof along said guide bar, said gate-controlling piston-cylinder unit comprises a piston rod, which is extensible into and retractable out of said recess, said coupling means comprise coupling noses, which protrude from respective ones of said gates, and locking means provided on said piston rod and adapted to couple said piston rod when it is extended to each of said noses when it is in said recess, and said retaining groove is arranged to receive each of said coupling noses when it is outside said recess.

8. The improvement set forth in claim 1, wherein said traversing drive is carried by a base member and said base member is adapted to be detachably connected to said carrier block by a connecting flange.

9. The improvement set forth in claim 1, wherein said traversing drive is carried by a base member, which consists of a casting and which is integrally formed with said one member of said primary unit and said traversing plate consists of a casting and is integrally formed with said one member of said final unit.

* * * * *